United States Patent

Erteszek

[15] 3,662,760
[45] May 16, 1972

[54] PANTY GIRDLE WITH DECORATIVE HOSE SUPPORT

[72] Inventor: Jan J. Erteszek, Los Angeles, Calif.
[73] Assignee: Olga Company, Van Nuys, Calif.
[22] Filed: June 19, 1970
[21] Appl. No.: 47,818

[52] U.S. Cl.....................................128/535, 2/240
[51] Int. Cl................................................A41c 1/00
[58] Field of Search.............2/224 R, 311, 336, 337, 338, 2/240; 128/528-540

[56] References Cited

UNITED STATES PATENTS

| | | | |
|---|---|---|---|
| 3,470,878 | 10/1969 | Gottlieb | 2/240 X |
| 3,496,944 | 2/1970 | Cuozzi | 128/535 X |
| 2,514,108 | 7/1950 | Vogt | 2/338 X |
| 3,287,739 | 11/1966 | Kaplan | 2/224 |
| 1,722,056 | 7/1929 | McComb | 2/338 |
| 3,503,078 | 3/1970 | Gallian | 2/311 |
| 2,996,726 | 8/1961 | Mayer | 2/240 |
| 3,559,654 | 2/1971 | Pope | 128/528 |

Primary Examiner—Jordan Franklin
Assistant Examiner—Geo. V. Larkin
Attorney—White, Haefliger and Bachand

[57] ABSTRACT

Panty girdle in which the leg portions are terminally edged by ornamentally patterned lace fabric bands adapted to support a wearer's hose, the bands elastically encircling the wearer's leg and having hose gripping adhesive distributed on their inside surfaces in a manner congruent with ornamental aspects of the bands.

4 Claims, 2 Drawing Figures

Patented May 16, 1972
3,662,760
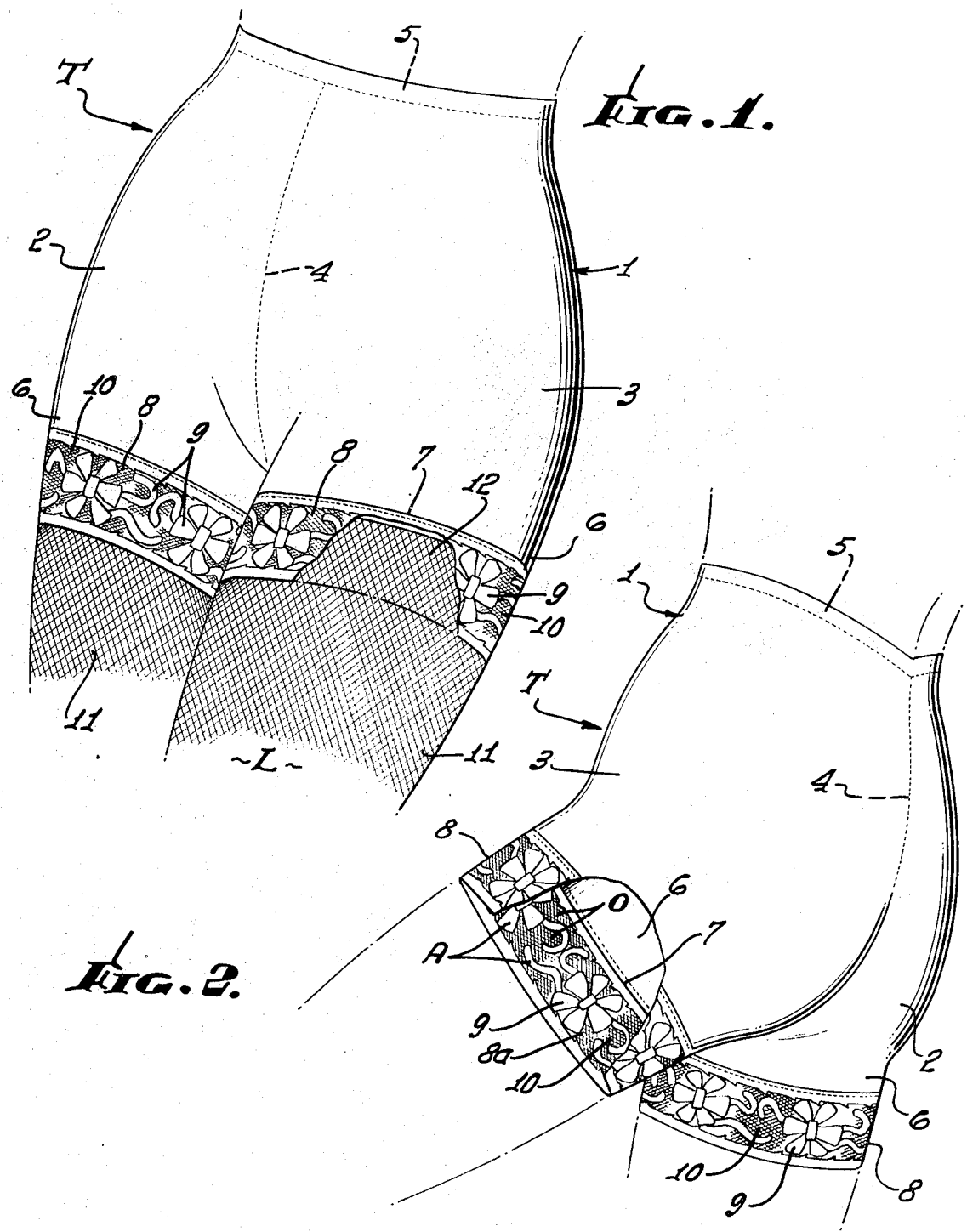

PANTY GIRDLE WITH DECORATIVE HOSE SUPPORT

BACKGROUND OF THE INVENTION

1. Field of the Invention

This invention has to do with girdles and more directly with the hose support features of panty girdles. The invention is particularly concerned with improvements in hose support features of panty girdles which permit achieving of the hose support function in such girdles without sacrifice of feminine aesthetics normally realizable through the use of lace edging on the leg portion of panty girdles.

2. Prior Art

Hose, or stocking, are worn for reasons of feminine fashion and comfort; they must be close-fitting and taut if these purposes are to be realized. While for many years hose were supported with clamp type devices, such as garter grips, which depend from a girdle or garter belt, the continuing rise of hemlines and the consequent popularity of panty hose, combined with the unattractive inherent bulkiness of these devices or spell their displacement as hose supports.

In place of metal-rubber clamps, there came a series of hose support ideas basically centered on the circumferential frictional engagement of a rubber material, suitably carried on the inside of a panty girdle leg, with the thigh portions of hose and particular panty hose. While such expedients were a considerable improvement over prior devices, the necessary pressure on the thigh to maintain the required degree of engagement for friction support occasioned for some an unattractive constriction of the thigh while others suffered hose droopiness due to insufficiently pressured engagement of the rubber material with the hose.

In either event, the necessary, obvious modification of the leg portion terminations to accommodate the relatively wide band of rubber material was in itself unattractive. Unless draped with a loose fitting lace overpanel, as in relatively costly garments, the lower extremities of the panty girdle, the most likely portions to have exposure on the wearer, were mechanical appearing and not attractive.

SUMMARY OF THE INVENTION

It is accordingly a major objective of the present invention to provide a hose supporting panty girdle in which the hose support comprises elasticized lace carrying a tacky adhesive to be both functionally effective and aesthetically pleasing and to afford a positive gripping of hose without reliance on undue pressure for supporting engagement with the hose.

To realize this objective and others to become apparent hereinafter, the invention contemplates a panty girdle having decorative leg portion terminations providing hose support means including exposed ornamentally patterned lace fabric bands edging the leg portions and freely depending therefrom, elastically circling the wearer's leg, and hose gripping adhesive distributed on the inside of the bands without outward exposure therethrough disruptive of the ornamental lacy pattern of the bands. The adhesive may be relatively clear and thinly applied to the inside of the band to be visually imperceptible thereon and may comprise adhesive composition deposited from an aerosol dispersion onto the band. In a preferred embodiment, the adhesive is temperature sensitive and thus body heat responsive to be relatively nonadherent and easily drawable over hose when the wearer is donning the girdle, becoming tacky to be hose adherent upon exposure to the wearer's body heat in the worn condition of the girdle.

BRIEF DESCRIPTION OF THE DRAWINGS

The invention will be further described as to an illustrative embodiment thereof in conjunction with the attached drawing, in which FIG. 1 is a perspective view from the side front of a lace band trimmed, hose supporting panty girdle according to the invention, partly broken away to show the underlying hose; and FIG. 2 is a perspective view from the side rear of the panty girdle of FIG. 1, broken away to show the inside surface of the lace band normally engaging the wearer's hose.

DESCRIPTION OF THE PREFERRED EMBODIMENTS

In reference to the drawing, a panty girdle 1 shown in the worn condition on torso T is seen to be comprised on left and right hand elasticized fabric body panels 2 and 3 respectively, sewn together at 4 along the girdle center line. An elastic waistband 5 is sewn within the girdle 1 at the top edge margin. The body panels 2, 3 terminate downwardly in girdle leg portions 6 adapted to closely fit about the wearer's thighs. The specific girdle construction shown is merely illustrative and other body panel arrangements, including separate front, side and reinforcing panels, crotch panels and the like may be employed.

The girdle leg portions 6 have sewn thereto at their lowermost outer edge margin 7, a decorative or elasticized lace band 8 which depends freely from the leg portion. The band 8 is a lace fabric, i.e., a net-like fabric carrying a decorative open-work pattern including solid portions 9 such as flowers, bows, ribbon or the like set among interstitial spaces 10 which are arranged to define and set off the solid areas 9 of the pattern.

It is a signal feature of the present invention that the reticulate, open and airy character of lace is retained while adding the function of hose support to the bands 8.

The hose 11 of nylon or the like and either separately formed or joined together as in panty hose are fitted on legs L with upper portions 12 located underneath the lace band 8. It will be noted that the lace bands 8 elastically encircle and bear against these upper hose portions 12 in the worn condition of the girdle portions about the wearer's thighs.

As thus arranged, the elasticized lace bands 8 provide decorative lower terminus for the panty girdle 1 in the occasional event of exposure and add a feminine touch to a basically functional garment.

In accordance with the present invention, the lace bands 8 are provided on their inner or hose-side surface 8a with means for gripping positively the hose portions 12 contacted by the bands without the overlaying of inharmonious patterns on the lace. This means comprises a tacky adhesive at areas A of the lace band pattern corresponding to solid portions 9 of the pattern and an absence of adhesive material at areas 0 corresponding to the interstices 10 of the pattern. The tacky adhesive may be thinly applied and clear to be visually imperceptible, as shown (FIG. 2), or decoratively transparently colored if desired. In either case the adhesive distribution will be selectively on the solid portions of the lace band pattern and not bridge the open portions between fibers to any extent disruptive of the open lacy character of the band pattern as viewed from without. As thus applied, the adhesive material is characterized by adherence to nylon and like hose fabric to a degree providing a positive gripping of the fabric exceeding mere frictional resistance to sliding movement as indicated by the unsupported retention of fabric by the adhesively coated material after contact is made therewith.

In general, the adhesive material may be any normally tacky composition. "Normally tacky" herein refers to a condition of continuing tackiness after drying for 24 hours following application. Characteristically such compositions function adhesively immediately upon application with light pressure and without any physical or chemical change in the adhesive layer and in being cleanly removable with only a light pull. The composition of these materials is generally primarily a film forming elastomer or rubberlike material such as butadiene-styrene, butyl, neoprene or and preferably polyisobutylene rubbers especially those having molecular weights in the range of 50,000 to 100,000 particularly in admixture with a lower molecular weight compatible polymer. Other elastomers may be used including acrylic and methacrylic polymers and copolymers, e.g., ethylene-acrylic acid copolymers, fluorocarbon polymers and alkyds.

The tack, specific adhesion and wetting power of these adhesive materials are largely determined by which resins are incorporated in the film former. Among resins typically used for this purpose are rosins, including hydrogenated or dehydrogenated versions, rosin esters, terpene polymers and hydrogenated coumarone-indene polymers. Preferred for use with the polyisobutylenes are the phenol-aldehyde resins. The distribution of adhesive may be by roller coating, dipping and the like, or preferably by spraying in a highly dispersed form such as an aerosol dispersion. In preferred practice, an emulsion or solution of the film former and tack resin will be prepared and packaged in a suitable aerosol dispensing container with a suitable propellant and the adhesive applied as an aerosol spray to the lace bands, prior to or after their assembly on the panty girdle. In this manner the solid portions of the bands are coated thinly and the interstices left open. A suitable formulation for the tacky adhesive used herein may include by weight 75 to 125 parts of polyisobutylene and 100 to 150 parts of phenol-formaldehyde resin which may be dissolved in sufficient liquid organic solvent, e.g., petroleum solvent for application to a substrate. Highly suitable is an aerosol tacky adhesive product sold by the 3M Company as Scotch Brand Spray Mounting Adhesive. The above description is illustrative of suitable tacky adhesives for use as hose support herein and may be widely varied as to ingredients and proportions as those familiar with the art of tacky adhesives will recognize. For example, the formulations may contain plasticizers such as pine tar and methyl ester of hydrogenated rosin, and filters and antioxidants.

Formulations of adhesive which are heat activatable to tackiness such as the 3M product mentioned, as well as others known to those in the art may be used to advantage where the heat response is in the range between room temperature and body heat. A panty girdle having such a responsive adhesive on the leg bands will be drawn easily over hose in donning the garment because the adhesive has lower tack at room temperature, but proximity to body heat in the worn condition will increase the tack of the adhesive and thus the bonding of the lace band to the hose.

While the invention has been particularly described as to a panty girdle embodiment, it will be apparent that an open crotch or "apron" type girdle having a bottom edging of elasticized lace carrying tacky adhesive may afford much of the hose support obtained in the panty girdle embodiment, particularly over panty hose.

I claim:

1. A panty girdle providing hose support comprising a wearer encircling body of elasticized fabric having leg portions, leg encircling elasticized fabric bands secured to the lower edge margins of the leg portions to overlie the wearer's legs, said bands having outwardly exposed open and solid areas arranged in a lace pattern, and on the inner surfaces of said bands for positively gripping said hose a uniformly thinly applied normally tacky adhesive composition capable of unsupported retention of hose fabric after contact therewith, said composition being distributed onto the band solid areas without exposed bridging across band open areas disruptive of the lace pattern of the bands.

2. Panty girdle according to claim 1 in which said adhesive composition is relatively clear to be visually imperceptible on said fabric bands.

3. Panty girdle according to claim 1 in which said fabric bands depend freely from the lowermost extremity of said leg portion.

4. Panty girdle according to claim 1 in which said adhesive composition is body heat responsive to be relatively more adherent upon exposure to the wearer's body heat in the worn condition of the girdle.

* * * * *